United States Patent
Kaneda (10) Patent No.: US 10,330,778 B2
(45) Date of Patent: Jun. 25, 2019

(54) COHERENT LIDAR SYSTEM USING TUNABLE CARRIER-SUPPRESSED SINGLE-SIDEBAND MODULATION

(71) Applicant: Alcatel-Lucent USA Inc., Murray Hill, NJ (US)

(72) Inventor: Noriaki Kaneda, Westfield, NJ (US)

(73) Assignee: NOKIA OF AMERICA CORPORATION, Murray Hill, NJ (US)

(*) Notice: Subject to any disclaimer, the term of this patent is extended or adjusted under 35 U.S.C. 154(b) by 421 days.

(21) Appl. No.: 15/172,406

(22) Filed: Jun. 3, 2016

(65) Prior Publication Data

US 2017/0350964 A1   Dec. 7, 2017

(51) Int. Cl.

| G01B 9/02 | (2006.01) |
|---|---|
| G01S 17/10 | (2006.01) |
| G01S 17/58 | (2006.01) |
| G01S 7/483 | (2006.01) |
| G01S 7/484 | (2006.01) |
| G01S 7/486 | (2006.01) |

(52) U.S. Cl.
CPC .......... *G01S 7/484* (2013.01); *G01B 9/02004* (2013.01); *G01S 7/483* (2013.01); *G01S 7/4865* (2013.01); *G01S 17/102* (2013.01); *G01S 17/58* (2013.01)

(58) Field of Classification Search
CPC ........ G01S 7/484; G01S 17/102; G01S 7/483; G01S 7/4865; G01S 17/58; G01B 9/02004
See application file for complete search history.

(56) References Cited

U.S. PATENT DOCUMENTS

| 4,528,669 | A | 7/1985 | Bostick et al. |
|---|---|---|---|
| 6,573,982 | B1 | 6/2003 | Pruitt |
| 8,760,634 | B2 | 6/2014 | Rose |
| 2002/0071109 | A1 | 6/2002 | Allen et al. |
| 2005/0083513 | A1 | 4/2005 | Rogers |
| 2008/0018881 | A1 | 1/2008 | Hui et al. |
| 2008/0038001 | A1* | 2/2008 | Becker ................ H04B 10/616 398/204 |

(Continued)

OTHER PUBLICATIONS

Gao, S., O'Sullivan, M., Hui, R. "Complex-optical-field lidar system for range and vector velocity measurement". Optics Express, vol. 20, No. 23, Nov. 5, 2012. (pp. 25867-25875).

(Continued)

*Primary Examiner* — Eric L Bolda
(74) *Attorney, Agent, or Firm* — Mendelsohn Dunleavy, P.C.; Yuri Gruzdkov (57) ABSTRACT

We disclose a lidar system that includes a modulator-based probe-light generator and a coherent optical receiver. The probe-light generator uses tunable carrier-suppressed single-sideband modulation to generate frequency-chirped optical pulses for the optical-probe beam directed at the target. The coherent optical receiver uses a homodyne detection scheme in which a split portion of the optical-probe beam is used as an optical local oscillator signal for detecting a corresponding optical beam reflected by the target. The resulting electrical RF signals generated by the receiver can be processed, e.g., using a disclosed signal-processing method, to determine one or both of the distance to the target and the velocity of the target.

20 Claims, 5 Drawing Sheets

(56) References Cited

U.S. PATENT DOCUMENTS

| | | | | |
|---|---|---|---|---|
| 2009/0046289 A1* | 2/2009 | Caldwell | ............... | F03D 7/02 |
| | | | | 356/341 |
| 2012/0235855 A1* | 9/2012 | Kurtz | ............... | G01S 7/35 |
| | | | | 342/109 |
| 2013/0104661 A1* | 5/2013 | Klotz | ............... | G01H 9/00 |
| | | | | 73/657 |

OTHER PUBLICATIONS

Abari, C. F., Pedersen, A. T., Mann, Jakob. "An all-fiber image-reject homodyne coherent Doppler wind lidar". Optics Express, vol. 22, No. 21, Oct. 20, 2014. (pp. 25880-25894).

Liao, T., Hameed, M., Hui, R. "Bandwidth efficient coherent lidar based on phase-diversity detection". Applied Optics, vol. 54, No. 11, Apr. 10, 2015. (pp. 3157-3161).

Inec, T., Fraiser, S. J., Muschinski, A., Pazmany, A. L. "An S-band frequency-modulated continuous-wave boundary later profiler: Description and initial results". Radio Science, vol. 38, No. 4, 2003. (pp. 11-1-11-10).

Lipa, B. J. and Barrick, D. E. "FMCW Signal Processing". 1990. (pp. 1-28).

International Search Report and Written Opinion; dated Aug. 25, 2017 for PCT Application No. PCT./US2017/033741.

Liang, H., "Implementation and tuning of optical single-sideband modulation in ring resonator-based optical beam forming systems for phased-array receive antennas." Master Thesis, University of Twente, 2009, 61 pages.

\* cited by examiner

COHERENT LIDAR SYSTEM USING TUNABLE CARRIER-SUPPRESSED SINGLE-SIDEBAND MODULATION

BACKGROUND

Field

The present disclosure relates to remote sensing and, more specifically but not exclusively, to light detection and ranging using tunable carrier-suppressed single-sideband modulation and coherent optical detection.

Description of the Related Art

This section introduces aspects that may help facilitate a better understanding of the disclosure. Accordingly, the statements of this section are to be read in this light and are not to be understood as admissions about what is in the prior art or what is not in the prior art.

Light detection and ranging, known as lidar, is a remote-sensing technique that can be used to measure a variety of parameters, such as distance, velocity, and vibration, and also for high-resolution imaging. Compared to radio-frequency (RF) remote sensing, lidar is capable of providing a finer range resolution and a higher spatial resolution due to the use of a higher carrier frequency and the ability to generate a smaller spot size at the foci. Lidar systems are used in urban planning, hydraulic and hydrologic modeling, geology, forestry, fisheries and wildlife management, mapping, three-dimensional (3D) imaging, engineering, coastal management, atmospheric science, meteorology, navigation, autonomous driving, etc.

SUMMARY OF SOME SPECIFIC EMBODIMENTS

Disclosed herein are various embodiments of a lidar system that includes a modulator-based probe-light generator and a coherent optical receiver. The probe-light generator uses tunable carrier-suppressed single-sideband modulation to generate frequency-chirped optical pulses for the optical-probe beam directed at the target. The coherent optical receiver uses a homodyne detection scheme in which a split portion of the optical-probe beam is used as an optical local oscillator signal for detecting a corresponding optical beam reflected by the target. The resulting electrical RF signals generated by the receiver can be processed, e.g., using a disclosed signal-processing method, to determine one or both of the distance to the target and the velocity of the target.

According to an example embodiment, provided is an apparatus comprising: a waveform generator operable to generate one or more electrical drive signals; an optical modulator operable to convert an optical beam having a fixed carrier frequency into a train of frequency-chirped optical pulses in response to the one or more electrical drive signals generated by the waveform generator; one or more optical elements configured to direct to a target an optical-probe beam that carries a first copy of the train and to receive from the target a corresponding reflected optical beam; and an optical receiver configured to determine one or more of a distance to the target and a velocity of the target in response to said corresponding reflected optical beam being applied to the optical receiver by the one or more optical elements. The waveform generator is configured to generate the one or more electrical drive signals in a manner that causes each of the frequency-chirped optical pulses of the train to have a carrier frequency that sweeps from a first frequency to a second frequency, one of the first and second frequencies being smaller than the fixed carrier frequency, and another one of the first and second frequencies being larger than the fixed carrier frequency.

According to another example embodiment, provided is a remote-sensing method comprising the steps of: generating one or more electrical drive signals using a waveform generator; converting an optical beam having a fixed carrier frequency into a train of frequency-chirped optical pulses by applying the one or more electrical drive signals to an optical modulator; directing to a target an optical-probe beam that carries a first copy of the train; receiving from the target a corresponding reflected optical beam; and determining one or more of a distance to the target and a velocity of the target in response to the corresponding reflected optical beam being detected by an optical receiver; and wherein the step of generating comprises generating the one or more electrical drive signals in a manner that causes each of the frequency-chirped optical pulses of the train to have a carrier frequency that sweeps from a first frequency to a second frequency, one of the first and second frequencies being smaller than the fixed carrier frequency, and another one of the first and second frequencies being larger than the fixed carrier frequency.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

A coherent lidar system can be designed using the principles of optical interferometry. For example, a frequency-modulated continuous-wave (FMCW) lidar system can use frequency-chirped optical pulses of relatively long pulse duration. A frequency-chirped optical pulse reflected from a target surface can be detected at the lidar receiver using a coherent-detection scheme in which the reflected optical pulse is mixed with an optical local-oscillator signal. In different embodiments of the lidar receiver, the optical local-oscillator signal can be generated using a free-running laser, the original laser source that generates the (unmodulated) carrier frequency, or a time-shifted version of the frequency-chirped optical pulse directed to the target. These three coherent-detection schemes are sometimes referred to as heterodyne mixing, self-heterodyne mixing, and homodyne mixing, respectively.

Figure 1:
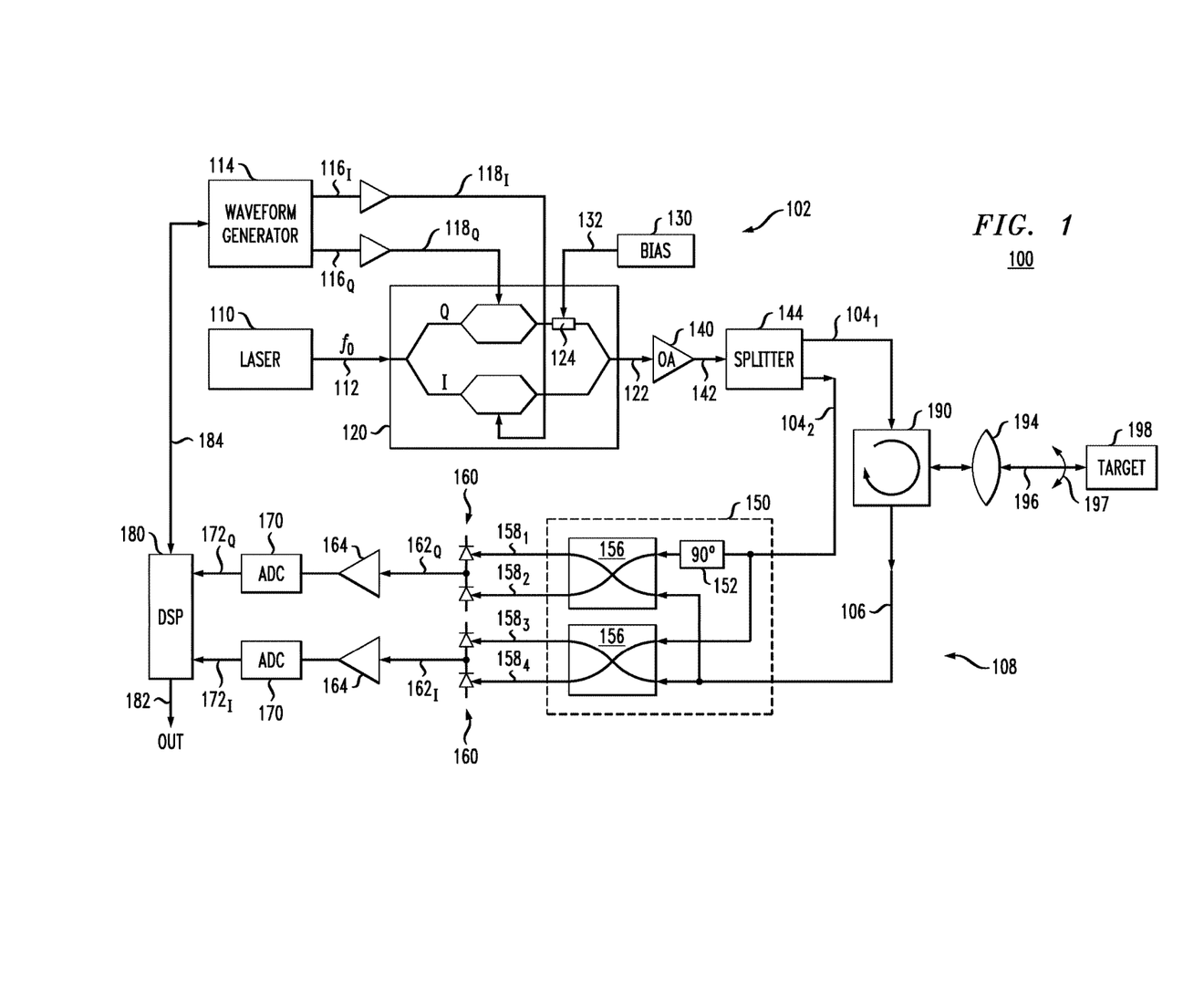
FIG. 1 shows a block diagram of a coherent lidar system according to an embodiment.

FIG. 1 shows a block diagram of a coherent lidar system 100 according to an embodiment. System 100 comprises a probe-light generator 102 and an optical receiver 108. Generator 102 operates to generate an optical-probe signal $104_1$ that is directed, through an optical circulator 190 and a lens system 194, to a target 198. A corresponding reflected optical signal 106 is recaptured by lens system 194 and applied by optical circulator 190 to optical receiver 108. In some embodiments, lens system 194 can have a scanning capability that enables system 100 to optically scan target 198 by moving the light spot generated by a corresponding light beam 196 across the target's surface, e.g., as indicated in FIG. 1 by a double-headed arrow 197. Depending on the specific application of system 100, lens system 194 can have one or more lenses arranged to operate as an optical collimator or a telescope.

Generator 102 comprises a laser source 110 that generates a continuous-wave optical beam 112 having a fixed carrier frequency, $f_0$. In various embodiments, carrier frequency $f_0$ can be in the ultraviolet, visible, near infrared, or infrared part of the optical spectrum. An optical IQ modulator 120 operates to transform optical beam 112 into a train 122 of frequency-chirped optical pulses. Example characteristics of pulse train 122 are described in more detail below in reference to FIGS. 2A-2E.

As used herein, the term "optical beam" should be construed to cover both free-space light waves and guided light waves that propagate along a corresponding optical waveguide or fiber, or any other suitable wave-guiding conduit.

In an example embodiment, optical IQ modulator 120 can be implemented using a nested Mach-Zehnder modulator, as shown in FIG. 1. The I and Q arms of modulator 120 are driven independently by electrical drive signals $118_I$ and $118_Q$, respectively, that are generated using a waveform generator 114 as indicated in FIG. 1. One of the modulator arms (e.g., the Q arm, as indicated in FIG. 1) incorporates a phase shifter 124 that is appropriately DC-biased, as known in the art, to introduce a 90-degree phase shift. A corresponding DC-bias signal 132 applied to phase shifter 124 is generated using a bias-voltage generator 130. Each of the I and Q arms is additionally DC-biased to enable optical-carrier suppression and rejection of one sideband.

In an alternative embodiment, a modulator structure that is different from the shown nested Mach-Zehnder structure can also be used to implement optical IQ modulator 120.

Generator 102 further comprises an optical amplifier 140 and an optical splitter 144. Optical amplifier 140 generates an amplified optical signal 142 by optically amplifying the optical pulses of train 122. Optical splitter 144 then splits amplified optical signal 142 into two portions. The first of these two portions is the above-mentioned optical-probe signal $104_1$. The second of these two portions is an optical reference signal $104_2$ that is used in optical receiver 108 as an optical local-oscillator signal for the homodyne-mixing detection scheme implemented therein. In different embodiments, optical splitter 144 can have different signal-splitting characteristics, e.g., to cause optical-probe signal $104_1$ and optical local-oscillator signal $104_2$ to have different respective intensities. In some embodiments, optical splitter 144 can be implemented using a conventional 3-dB optical splitter.

Optical receiver 108 comprises an optical hybrid 150 that receives reflected optical signal 106 and optical local-oscillator signal $104_2$ at two different input ports thereof. Optical hybrid 150 operates to split each of optical signals 106 and $104_2$ into two respective (attenuated) copies, e.g., using conventional 3-dB power splitters (not explicitly shown in FIG. 1). A relative phase shift of about 90 degrees ($\pi/2$ radian) is applied to one copy of optical local-oscillator signal $104_2$ using a phase shifter 152.

In an example embodiment, optical hybrid 150 comprises two optical signal mixers 156 that operate to optically mix the various copies of optical signals 106 and $104_2$ as shown in FIG. 1 to cause the mixed signal copies to optically interfere with one another. The resulting optical interference signals $158_1$-$158_4$ are detected using four photo-detectors (e.g., photodiodes) 160. Photo-detectors 160 are arranged in pairs, as shown in FIG. 1, to implement a balanced detection scheme. The output of one photo-detector pair is an electrical signal $162_I$, and the output of the other photo-detector pair is an electrical signal $162_Q$. A person of ordinary skill in the art will understand that electrical signals $162_I$ and $162_Q$ provide measures of the in-phase (I) and quadrature (Q) components of optical signal 106 with respect to optical local-oscillator signal $104_2$.

Each of electrical signals $162_I$ and $162_Q$ can optionally be amplified in a respective one of electrical amplifiers 164 and converted into digital form using a respective one of analog-to-digital converters (ADCs) 170. Each ADC 170 samples the received electrical signal at an appropriate sampling rate to produce a corresponding one of digital signals $172_I$ and $172_Q$. Digital signals $172_I$ and $172_Q$ are applied to a digital signal processor (DSP) 180 that processes these digital signals, e.g., as described in more detail below in reference to FIG. 4, to determine the distance to and/or velocity of target 198. DSP 180 outputs the processing results via an output signal 182 that can be further processed by an external processor or computer, e.g., to display the distance/velocity measurement results on a graphical user interface, save the results in a memory, and/or transmit the results to a remote location.

In some embodiments, DSP 180 can optionally be used to control the operation of waveform generator 114, e.g., by way of a control signal 184. For example, DSP 180 can use control signal 184 to provide appropriate digital waveforms to be used by waveform generator 114 in the process of generating electrical drive signals $118_I$ and $118_Q$ (see, e.g., FIG. 3).

In some embodiments, waveform generator 114 can be an analog device, e.g., implemented using a bank of voltage-controlled oscillators (VCOs), each configured to provide a frequency sweep over a respective part of the bandwidth. An appropriate switch network can be used to sequentially connect different VCOs in the bank to output ports $116_I$ and $116_Q$ of waveform generator 114 in a manner that causes the waveform generator to generate a desired continuous frequency sweep over the entire signal bandwidth.

A person of ordinary skill in the art will understand that other embodiments of waveform generator 114, including the commercially available arbitrary waveform generators, can also be used in system 100.

Figure 2A:
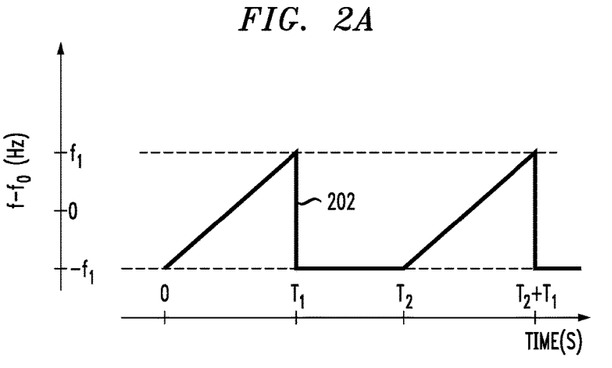
FIGS. 2A-2E graphically illustrate example characteristics of an optical-probe signal that can be used in the coherent lidar system of FIG. 1 according to an embodiment.
Figure 2B:
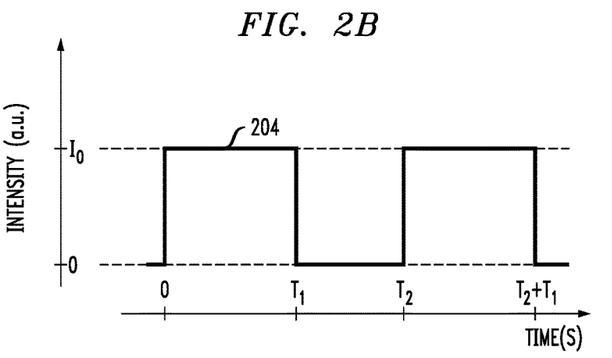
Figure 2C:
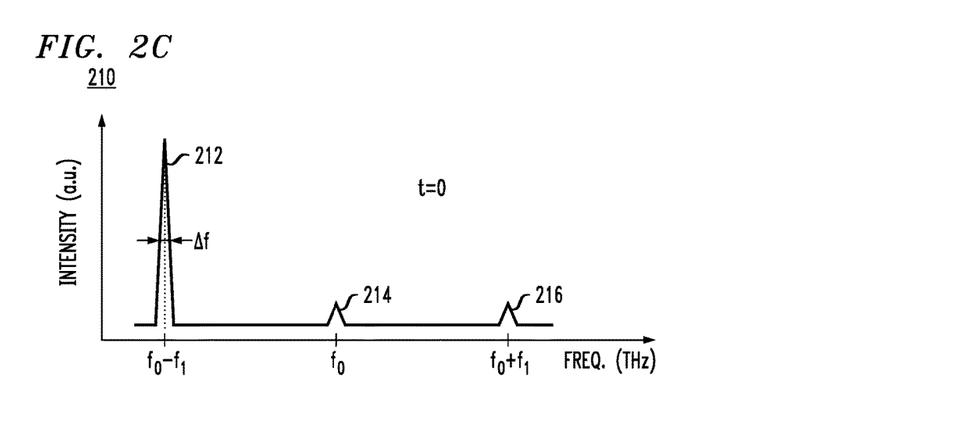
Figure 2D:
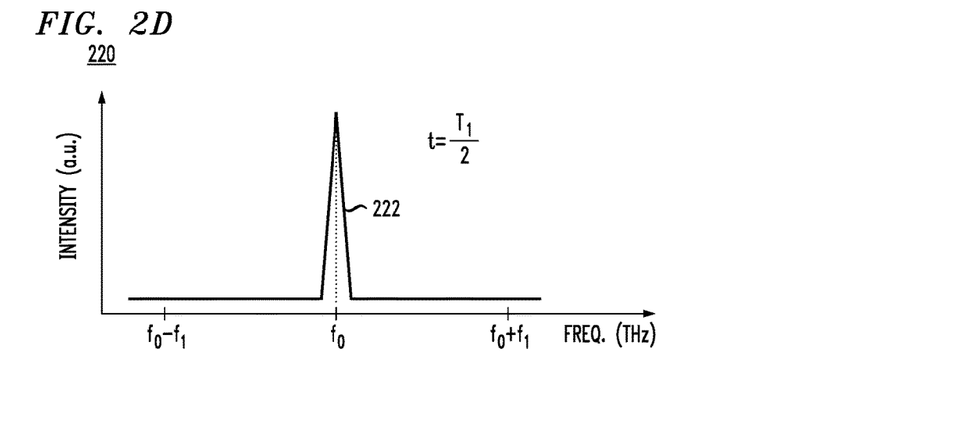
Figure 2E:
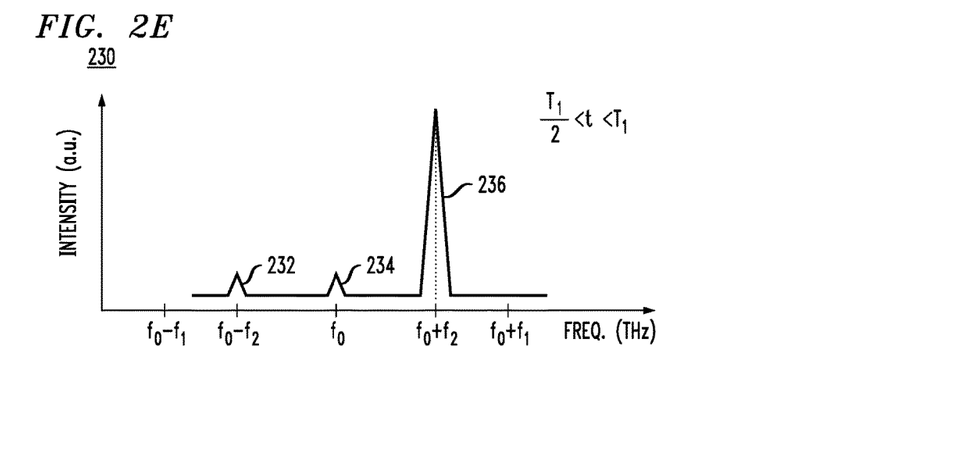

FIGS. 2A-2E graphically illustrate example characteristics of optical-probe signal $104_1$ that can be used in system 100 (FIG. 1) according to an embodiment. More specifically, FIG. 2A graphically illustrates the frequency chirp of optical-probe signal $104_1$. FIG. 2B graphically shows the intensity envelope of optical-probe signal $104_1$. FIGS. 2C-2E graphically show example instantaneous spectra of optical-probe signal $104_1$. The spectra shown in FIGS. 2C-2E are "instantaneous" in the sense that that the spectrum acquisition time $\tau$ is much shorter (e.g., by a factor of ten or more) than the duration $T_1$ of an optical pulse, i.e., $\tau \ll T_1$. Only two optical pulses of optical-probe signal $104_1$ are shown in FIGS. 2A-2B for illustration purposes. As already indicated above, optical-probe signal $104_1$ can have an arbitrary number N of such optical pulses.

Referring to FIG. 2A, the optical modulation imposed by optical IQ modulator 120 causes the instantaneous carrier frequency of optical-probe signal $104_1$ to linearly change from the frequency $(f_0-f_1)$ to the frequency $(f_0+f_1)$ within the duration $T_1$ of each optical pulse, where $2f_1$ is the bandwidth of the optical-probe signal. The resulting frequency chirp can be approximately represented by a sawtooth waveform 202 shown in FIG. 2A. Each sawtooth of waveform 202 corresponds to a respective single optical pulse of optical-probe signal $104_1$.

Referring to FIG. 2B, optical-probe signal $104_1$ is also amplitude modulated in an ON/OFF manner, using a rectangular waveform 204 with a period $T_2$. Within each period $T_2$ of waveform 204, optical-probe signal $104_1$ has (i) a constant non-zero intensity $I_0$ for the duration $T_1$ and (ii) a substantially zero intensity for the remaining duration $(T_2-T_1)$. As a result, optical-probe signal $104_1$ has a duty cycle $D=T_1/T_2$. In an example embodiment, $D \le 50\%$. In some embodiments, the duty cycle D can be approximately 100%, in which case $T_1 \approx T_2$.

The optical modulation graphically illustrated by FIGS. 2A-2B causes an instantaneous spectrum of an optical pulse of optical-probe signal $104_1$ to substantially contain a single relatively narrow spectral band (e.g., line) whose spectral position is time dependent, e.g., as illustrated in FIGS. 2C-2E. This spectral band (line) is relatively narrow in the sense that its spectral width (e.g., FWHM, $\Delta f$; see FIG. 2C) is significantly smaller (e.g., by a factor of ten or more) than $f_1$, e.g., $\Delta f \ll f_1$. The duration $T_1$ is relatively long in the sense that $f_1 \gg 2\pi/T_1$.

Within the duration $T_1$ of each optical pulse of optical-probe signal $104_1$, the peak frequency linearly sweeps from the frequency $(f_0-f_1)$ to the frequency $(f_0+f_1)$. For example, FIG. 2C shows an instantaneous spectrum 210 of probe signal $104_1$ at time t=0 (also see FIGS. 2A-2B). Spectrum 210 has a prominent peak 212 representing a first modulation sideband of the fixed carrier frequency $f_0$ of optical pulse of train 112. Peak 212 is spectrally located at the frequency $(f_0-f_1)$. A relatively weak peak 214 in spectrum 210 represents the suppressed carrier at frequency $f_0$. Another relatively weak peak 216 in spectrum 210 represents a suppressed second modulation sideband of the fixed carrier frequency $f_0$ of optical pulse of train 112. Peak 216 is spectrally located at the frequency $(f_0+f_1)$ because the spectral locations of the two modulation sidebands are symmetric with respect to the carrier frequency $f_0$.

The carrier frequency $f_0$ of optical pulse train 112 prominently appears in the instantaneous spectra of optical-probe signal $104_1$ only at the time corresponding to the middle of the optical pulse. An instantaneous spectrum 220 shown in FIG. 2D is acquired at time $t \approx T_1/2$ and graphically illustrates the latter characteristic of optical-probe signal $104_1$. As can be seen in FIG. 2D, spectrum 220 has a prominent peak 222 spectrally located at frequency $f_0$.

FIG. 2E shows an instantaneous spectrum 230 of probe signal $104_1$ acquired at the time t that falls into the time interval between $T_1/2$ and $T_1$ (also see FIGS. 2A-2B). Spectrum 230 has a prominent peak 236 representing a first modulation sideband of the fixed carrier frequency $f_0$ of optical pulse of train 112. Peak 236 is spectrally located at the frequency $(f_0+f_2)$, where $f_2<f_1$. A relatively weak peak 234 in spectrum 230 represents the suppressed carrier at frequency $f_0$. Another relatively weak peak 232 in spectrum 230 represents a suppressed second modulation sideband of the fixed carrier frequency $f_0$ of optical pulse of train 112. Peak 232 is spectrally located at the frequency $(f_0-f_2)$ because the spectral locations of the two modulation sidebands are symmetric with respect to the carrier frequency $f_0$.

Due to the spectral characteristics of optical-probe signal $104_1$ explained above in reference to FIGS. 2A-2E, the optical modulation imposed by optical IQ modulator 120 in system 100 can be referred to as tunable carrier-suppressed single-sideband modulation (TCS-SSM). One of possible benefits/advantages of TCS-SSM over at least some modulation techniques used in conventional lidar systems is that it enables seamless usage of the spectrum around the carrier frequency $f_0$, without any spectral gap between the used portion of the spectrum located at the frequencies that are lower than $f_0$ and the used portion of the spectrum located at the frequencies that are higher than $f_0$. As a result, embodiments of system 100 can potentially provide a significant improvement in the range resolution and/or directional velocity measurements compared to those of comparable conventional lidar systems.

Figure 3:
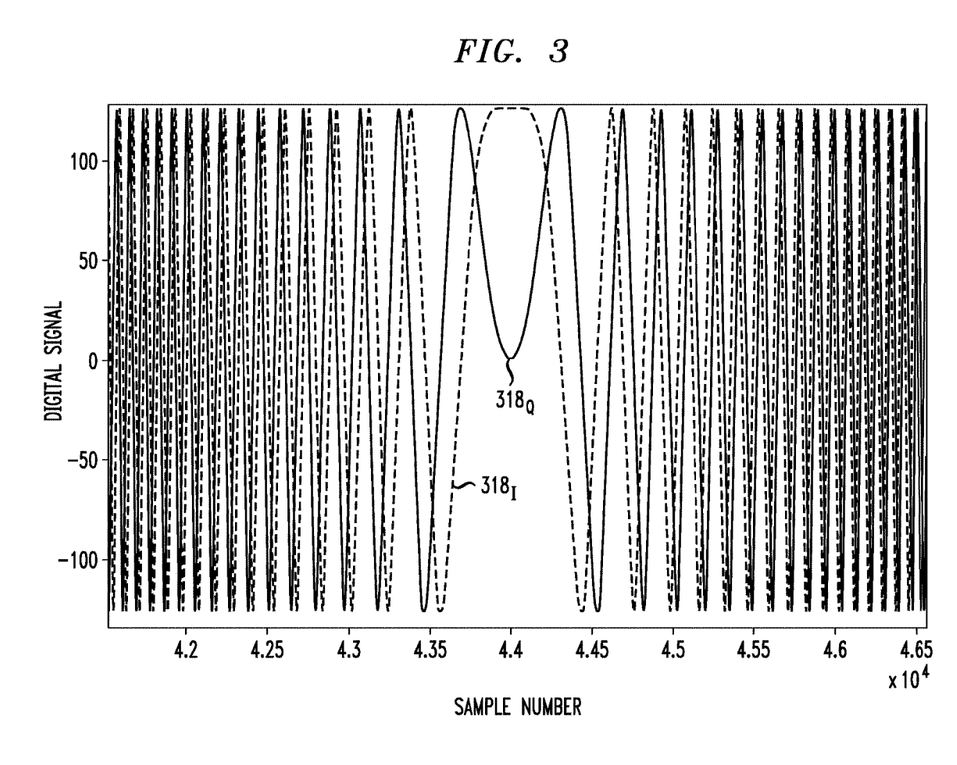
FIG. 3 graphically illustrates electrical drive signals that can be used in the coherent lidar system of FIG. 1 according to an embodiment.

FIG. 3 graphically illustrates electrical drive signals $118_I$ and $118_Q$ that can be used in system 100 (FIG. 1) according to an embodiment. More specifically, FIG. 3 graphically shows digital waveforms $318_I$ and $318_Q$ that can be supplied by way of control signal 184 to waveform generator 114 for the generation of analog electrical drive signals $118_I$ and $118_Q$, respectively, to cause optical-probe signal $104_1$ to have the characteristics described above in reference to FIGS. 2A-2E. In the shown example, the center of the corresponding rectangular intensity pulse is at digital sample number 44000. The pulse duration can be changed, as appropriate or necessary, by changing the time increment assigned to the interval that separates two consecutive digital samples in digital waveforms $318_I$ and $318_Q$ along the horizontal axis of the graph. In an example embodiment, the pulse width $T_1$ can be on the order of 1 µs (also see FIG. 2B).

The frequency chirp in digital waveforms $318_I$ and $318_Q$ manifests itself by the progressively faster oscillations as the time separation from the center (i.e., digital sample number 44000) of the optical pulse increases. The phase relationship between digital waveforms $318_I$ and $318_Q$ is such that, for digital sample numbers smaller than 44000, digital waveform $318_I$ leads digital waveform $318_Q$. This phase relationship causes the positive modulation sideband (i.e., the modulation sideband corresponding to $f>f_0$) to be suppressed in the corresponding optical pulse of train 122. In contrast, for digital sample numbers greater than 44000, digital waveform $318_I$ trails digital waveform $318_Q$. The latter phase relationship similarly causes the negative modulation sideband (i.e., the modulation sideband corresponding to $f<f_0$) to be suppressed in the corresponding optical pulse of train 122.

A mathematical expression for the frequency-modulated electric field, $E_t$, of an optical pulse of optical-probe signal $104_1$ that can be generated using digital waveforms analogous to digital waveforms $318_I$ and $318_Q$ is given by Eq. (1) as follows:

$$E_t = A_0 \exp(2\pi j f_1 t[-1+2t/T]) \qquad (1)$$

where t is time in the time interval $0 \le t \le T$, and $T=T_1=T_2/2$. As such, Eq. (1) corresponds to a case in which the duty cycle D is 50%. For illustration purposes, all mathematical expressions below are given for this particular case. A person of ordinary skill in the art will understand how to modify these mathematical expressions to obtain mathematical expressions corresponding to a case of an arbitrary duty cycle D, in which case $T_1 \ne T_2/2$.

For a stationary target 198, the frequency-modulated electric field, $E_r$, of the corresponding optical pulse in reflected optical signal 106 is given by Eq. (2) as follows:

$$E_r = A_1 \exp(2\pi j f_1(t-\Delta t)[-1+2(t-\Delta t)/T]) \quad (2)$$

where $A_1$ is the amplitude of the of reflected optical signal, and $\Delta t$ is the round-trip time to the target given by Eq. (3):

$$\Delta t = 2R/c \quad (3)$$

where R is the distance to the target, and c is the speed of light.

After optical signals 104$_2$ and 106 are optically mixed in optical hybrid 150, the above-shown electric fields $E_r$ and $E_{r'}$ of these optical signals interfere to cause photo-detectors 160 to generate electrical signals 162$_I$ and 162$_Q$ that can be approximated by Eqs. (4a)-(4b) as follows:

$$X_I(t) \propto \cos(2\pi f_p t + \varphi) \quad (4a)$$

$$X_Q(t) \propto \sin(2\pi f_p t + \varphi) \quad (4b)$$

where $X_I(t)$ and $X_Q(t)$ denote electrical signals 162$_I$ and 162$_Q$, respectively; $\varphi$ is a constant phase; and frequency $f_p$ is the RF beat frequency given by Eq. (5) as follows:

$$f_p = 2f_1 \Delta t/T = 4f_1 R/(cT) \quad (5)$$

Eqs. (4a)-(4b) indicate that each of electrical signals 162$_I$ and 162$_Q$ has a frequency tone at the frequency $f_p$. Hence, the distance R to target 198 can be determined, e.g., by (i) spectrally analyzing one or both of electrical signals 162$_I$ and 162$_Q$ to determine the frequency $f_p$ and (ii) calculating the distance R using Eq. (5).

For a moving target 198, the expression for frequency $f_p$ is similar to that of Eq. (5), but also includes a Doppler shift as shown in Eq. (6):

$$f_p = 4f_1 R_0/(cT) + 2f_0 u/c \quad (6)$$

where u is the projection of the target's velocity onto the straight line connecting the target and lens system 194; and $R_0$ is the initial distance to the moving target 198 at the time of the first optical pulse of optical-probe signal 104$_1$ during the measurement. In addition, the phase $\varphi$ is no longer constant, and depends on the pulse number n in the train of pulses of optical-probe signal 104$_1$ as indicated by Eq. (7):

$$X_n(t) \equiv X_I(t) + jX_Q(t) \propto \exp\left[-j\left(\frac{4\pi f_0 u t}{c} + \frac{8\pi R_0 f_1}{cT}(t - 2nT)\right)\right] \quad (7)$$

where $X_n(t)$ represents electrical signals 162$_I$ and 162$_Q$ in the complex-valued form; and the time t belongs to the following interval: $(2n-1)T \leq t \leq 2nT$.

Eq. (7) indicates that both the target velocity u and the distance to the target $R_0$ can be obtained by applying a two-dimensional (2D) Fourier transform to the complex-valued RF signal $X_n(t)$. The first dimension of this 2D Fourier transform corresponds to the time t. The second dimension of this 2D Fourier transform corresponds to the pulse number n. The first and second dimensions of a 2D Fourier transform of this nature are often referred to in the pertinent literature as the direct dimension and the indirect dimension, respectively. The 2D spectrum obtained in this manner contains a cross-peak with the frequency coordinates $(f_d, f_i)$, where $f_d$ is the frequency coordinate in the direct dimension of the 2D spectrum, and $f_i$ is the frequency coordinate in the indirect dimension of the 2D spectrum. The values of $f_d$ and $f_i$ are given by Eqs. (8a)-(8b) as follows:

$$f_d = f_p \quad (8a)$$

$$f_i = \frac{2f_0 u}{c} \quad (8b)$$

The target velocity u can therefore be determined from the value of $f_i$ using Eq. (8b). The distance to the target $R_0$ can then be determined from the value of $f_d$ using Eqs. (8a) and (6).

Figure 4:
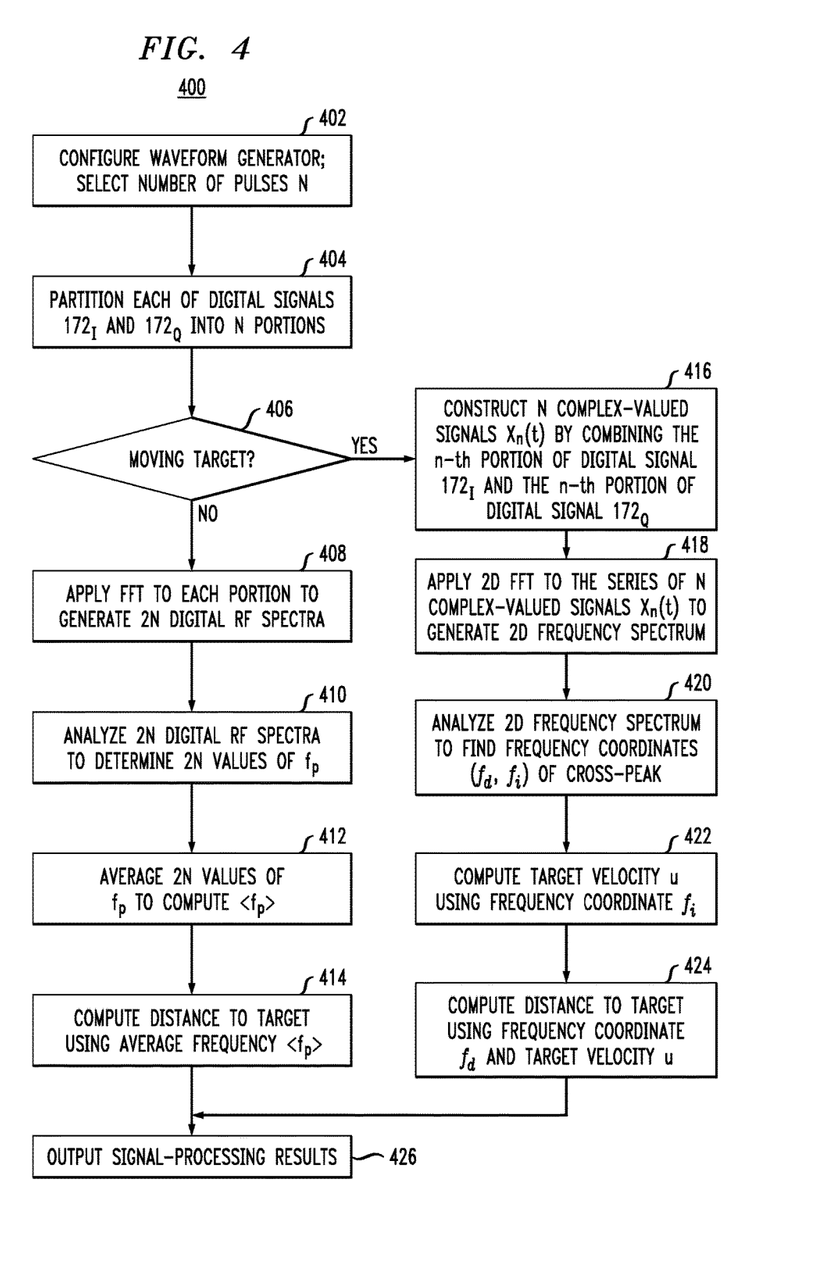
FIG. 4 shows a flowchart of a signal processing method that can be used in the coherent lidar system of FIG. 1 according to an embodiment.

FIG. 4 shows a flowchart of a signal processing method 400 that can be implemented using DSP 180 to determine the distance to and/or velocity of target 198 according to an embodiment.

At step 402 of method 400, DSP 180 configures waveform generator 114, e.g., by way of control signal 184, to cause appropriate electrical drive signals 118$_I$ and 118$_Q$ to be applied to optical IQ modulator 120. In some embodiments, step 402 may include the sub-steps of (i) providing appropriate digital waveforms, such as digital waveforms 318$_I$ and 318$_Q$ (FIG. 3), to waveform generator 114 and (ii) specifying the number N of pulses in the train of optical pulses to be used in the distance/velocity measurement.

At step 404, DSP 180 receives digital signals 172$_I$ and 172$_Q$ corresponding to the N optical pulses of optical-probe signal 104$_1$ generated by generator 102 using the configuration set-up at step 402. Each of digital signals 172$_I$ and 172$_Q$ is then partitioned into N portions, with each portion corresponding to a respective single optical pulse of optical-probe signal 104$_1$.

Step 406 causes DSP 180 to apply different signal-processing algorithms depending on whether target 198 is stationary or moving. If target 198 is a stationary target, then the processing of method 400 is directed to step 408. If target 198 is a moving target, then the processing of method 400 is directed to step 416.

At step 408, DSP 180 generates 2N digital RF spectra by individually applying a fast Fourier transform (FFT) to each of the N portions of digital signal 172$_I$ and each of the N portions of digital signal 172$_Q$ generated at step 404.

At step 410, DSP 180 analyzes each of the 2N digital RF spectra generated at step 408 to find a respective RF tone corresponding to Eqs. (4a)-(4b), and to determine the respective peak frequency $f_p$ of that RF tone. The signal processing carried out at step 410 therefore produces a set of 2N values of frequency $f_p$.

At step 412, DSP 180 computes the average frequency, $\langle f_p \rangle$, by summing the 2N values of frequency $f_p$ determined at step 410 and then dividing the resulting sum by 2N.

At step 414, DSP 180 computes the distance R to target 198 using Eq. (5) and the average frequency $\langle f_p \rangle$ computed at step 412. The use of the average frequency $\langle f_p \rangle$ in the calculations helps to improve the range resolution, $\delta R$. A person of ordinary skill in the art will understand that the range resolution $\delta R$ is inversely proportional to the number 2N of the processed digital RF spectra and therefore can be improved by increasing the number N of optical pulses used in the measurement. A person of ordinary skill in the art will further understand that the range resolution $\delta R$ is also inversely proportional to the modulation bandwidth $2f_1$ and therefore can be improved by increasing the bandwidth of optical-probe signal 104$_1$.

At step 416, DSP 180 constructs N complex-valued RF signals $X_n(t)$ by combining the n-th portion of digital signal $172_I$ and the n-th portion of digital signal $172_Q$ generated at step 404, e.g., in accordance with Eq. (7), where n=1, 2, . . . , N.

At step 418, DSP 180 generates a 2D frequency spectrum by applying a 2D FFT to the series of N complex-valued RF signals $X_n(t)$ constructed at step 416.

At step 420, DSP 180 analyzes the 2D frequency spectrum generated at step 418 to find a corresponding cross-peak therein. DSP 180 then determines the cross-peak's frequency coordinates $(f_d, f_i)$.

At step 422, DSP 180 computes the target velocity u. As already, indicated above the target velocity u can be computed based on the frequency $f_i$ determined at step 420, e.g., using Eq. (8b).

At step 424, DSP 180 computes the distance $R_0$ to target 198 using the frequency $f_d$ determined at step 420, the target velocity u computed at step 422, and Eqs. (8a) and (6).

At step 426, DSP 180 outputs the signal-processing results, e.g., the distance to target 198 and the velocity of target 198, via output signal 182.

While this disclosure includes references to illustrative embodiments, this specification is not intended to be construed in a limiting sense. For example, based on the description provided above, a person of ordinary skill in the art will be able to make and use, without undue experimentation, one or more alternative embodiments that include one or more of the following example modifications:

(1) the frequency chirp illustrated in FIG. 2A is replaced by a frequency chirp in which the instantaneous carrier frequency of an optical pulse of optical-probe signal $104_1$ changes in the opposite direction, e.g., linearly decreases from the frequency $(f_0+f_1)$ to the frequency $(f_0-f_1)$;

(2) the rate of the carrier-frequency increase or decrease is not constant within the duration of an optical pulse of optical-probe signal $104_1$;

(3) the start and end frequencies of the frequency chirp are not equidistant with respect to carrier frequency $f_0$; and (4) the distance and velocity determinations of method 400 are carried out using only one of digital signals $172_I$ and $172_Q$. The velocity determined in this manner may have an ambiguity regarding the direction in which target 198 is moving.

Various modifications of the described embodiments, as well as other embodiments within the scope of the disclosure, which are apparent to persons skilled in the art to which the disclosure pertains are deemed to lie within the principle and scope of the disclosure, e.g., as expressed in the appended claims.

According to an example embodiment disclosed above in reference to FIGS. 1-4, provided is an apparatus (e.g., 100, FIG. 1) comprising: a waveform generator (e.g., 114, FIG. 1) operable to generate one or more electrical drive signals (e.g., $118_I/118_Q$, FIG. 1); an optical modulator (e.g., 120, FIG. 1) operable to convert an optical beam (e.g., 112, FIG. 1) having a fixed carrier frequency into a train (e.g., 122, FIG. 1) of frequency-chirped optical pulses in response to the one or more electrical drive signals generated by the waveform generator; one or more optical elements (e.g., 190, 194, FIG. 1) configured to direct to a target (e.g., 198, FIG. 1) an optical-probe beam (e.g., $104_1$, FIG. 1) that carries a first copy of the train and to receive from the target a corresponding reflected optical beam (e.g., 106, FIG. 1); and an optical receiver (e.g., 108, FIG. 1) configured to determine (e.g., using 400, FIG. 4) one or more of a distance to the target and a velocity of the target in response to said corresponding reflected optical beam being applied to the optical receiver by the one or more optical elements; and wherein the waveform generator is configured to generate the one or more electrical drive signals in a manner that causes each of the frequency-chirped optical pulses of the train to have a carrier frequency that sweeps from a first frequency to a second frequency, one of the first and second frequencies (e.g., $(f_0-f_1)$, FIG. 2A) being smaller than the fixed carrier frequency, and another one of the first and second frequencies (e.g., $(f_0+f_1)$, FIG. 2A) being larger than the fixed carrier frequency.

In some embodiments of the above apparatus, the waveform generator is further configured to generate the one or more electrical drive signals in a manner that causes an optical carrier wave having the fixed carrier frequency to be suppressed (e.g., 214, FIG. 2C; 234, FIG. 2E) in the frequency-chirped optical pulses of the train.

In some embodiments of any of the above apparatus, the waveform generator is further configured to generate the one or more electrical drive signals in a manner that causes an instantaneous spectrum of a frequency-chirped optical pulse of the train to substantially have a single modulation sideband (e.g., 212, FIG. 2C; 236, FIG. 2E) of the fixed carrier frequency, the single modulation sideband representing an instantaneous carrier frequency of the frequency-chirped optical pulse. As used herein, the term "substantially" refers to a magnitude difference of 3 dB or more.

In some embodiments of any of the above apparatus, the waveform generator is further configured to generate the one or more electrical drive signals in a manner that causes a second modulation sideband (e.g., 216, FIG. 2C; 232, FIG. 2E) of the fixed carrier frequency corresponding to the single modulation sideband to be suppressed in the frequency-chirped optical pulses of the train.

In some embodiments of any of the above apparatus, the first frequency is smaller than the second frequency.

In some embodiments of any of the above apparatus, the first frequency is larger than the second frequency.

In some embodiments of any of the above apparatus, the first frequency and the second frequency are equidistant (e.g., by $f_1$, FIG. 2A) from the fixed carrier frequency.

In some embodiments of any of the above apparatus, the waveform generator is configured to generate the one or more electrical drive signals in a manner that causes the carrier frequency of each of the frequency-chirped optical pulses to linearly change from the first frequency to the second frequency.

In some embodiments of any of the above apparatus, the optical receiver comprises: an optical hybrid (e.g., 150, FIG. 1) configured to optically mix said corresponding reflected optical beam and an optical local-oscillator signal (e.g., $104_2$, FIG. 1) that carries a second copy of the train to generate a plurality of optical interference signals (e.g., $158_1$-$158_4$, FIG. 1); an optical-to-electrical converter (e.g., 160/164/170, FIG. 1) configured to convert the plurality of optical interference signals into a first electrical digital signal (e.g., $172_I$, FIG. 1) and a second electrical digital signal (e.g., $172_Q$, FIG. 1); and a digital signal processor (e.g., 180, FIG. 1) configured to process at least one of the first and second electrical digital signals to determine the one or more of the distance to the target and the velocity of the target.

In some embodiments of any of the above apparatus, the apparatus further comprises an optical power splitter (e.g., 144, FIG. 1) configured to generate the optical-probe beam and the optical local-oscillator signal by optically splitting an optical beam (e.g., 142, FIG. 1) that carries the train of frequency-chirped optical pulses.

In some embodiments of any of the above apparatus, the digital signal processor is further configured to supply (e.g., by way of 184, FIG. 1) one or more digital waveforms (e.g., 318$_I$/318$_Q$, FIG. 3) to cause the waveform generator to generate the one or more electrical drive signals.

In some embodiments of any of the above apparatus, the digital signal processor is further configured to: partition (e.g., 404, FIG. 4) each of the first and second electrical digital signals into a plurality of portions, each of the portions corresponding to a respective single frequency-chirped optical pulse of the optical-probe beam; apply a Fourier transform (e.g., 408, 418, FIG. 4) to the plurality of portions to generate a set of digital spectra, the set having one or more digital spectra; and process (e.g., 410-424, FIG. 4) the set of digital spectra to determine the one or more of the distance to the target and the velocity of the target.

In some embodiments of any of the above apparatus, the Fourier transform is a two-dimensional Fourier transform (e.g., 418, FIG. 4); and wherein the set of digital spectra includes a two-dimensional frequency spectrum.

In some embodiments of any of the above apparatus, the digital signal processor is further configured to: perform a spectral analysis (e.g., 420, FIG. 4) of the two-dimensional frequency spectrum to determine first and second frequency coordinates of a cross-peak therein; and compute (e.g., 422, FIG. 4) the velocity of the target using the first frequency coordinate.

In some embodiments of any of the above apparatus, the digital signal processor is further configured to compute (e.g., 424, FIG. 4) the distance to the target using the second frequency coordinate and the velocity of the target.

In some embodiments of any of the above apparatus, the digital signal processor is further configured to: perform a spectral analysis (e.g., 410, FIG. 4) of the set of digital spectra to determine a corresponding plurality of frequency values (e.g., f$_p$, Eq. (4)), each of the frequency values being a peak frequency of a radio-frequency tone in a respective one of the plurality of digital spectra; compute (e.g., 412, FIG. 4) an average frequency (e.g., <f$_p$>) of said corresponding plurality of frequency values; and compute (e.g., 414, FIG. 4) the distance to the target using the average frequency.

In some embodiments of any of the above apparatus, the one or more optical elements are reconfigurable to cause the optical-probe beam to optically scan a surface of the target.

In some embodiments of any of the above apparatus, the optical modulator comprises a nested Mach-Zehnder modulator having a first arm (e.g., I, FIG. 1) electrically driven by a first of the one or more electrical drive signals (e.g., 118$_I$, FIG. 1) and a second arm (e.g., Q, FIG. 1) electrically driven by a second of the one or more electrical drive signals (e.g., 118$_Q$, FIG. 1), the second arm connected in parallel to the first arm.

In some embodiments of any of the above apparatus, the second arm includes a configurable phase shifter (e.g., 124, FIG. 1).

In some embodiments of any of the above apparatus, the apparatus further comprises a laser source (e.g., 110, FIG. 1) configured to generate the optical beam having the fixed carrier frequency.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

A person of ordinary skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as a magnetic disks or tapes, hard drives, or optically readable digital data storage media. The embodiments are also intended to cover computers programmed to perform said steps of methods described herein.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

What is claimed is:

1. An apparatus comprising:
a waveform generator operable to generate one or more electrical drive signals;
an optical modulator operable to convert an optical beam having a fixed carrier frequency into a train of frequency-chirped optical pulses in response to the one or more electrical drive signals generated by the waveform generator;
one or more optical elements configured to direct to a target an optical-probe beam that carries a first copy of the train and to receive from the target a corresponding reflected optical beam; and
an optical receiver configured to determine one or more of a distance to the target and a velocity of the target in response to said corresponding reflected optical beam being applied to the optical receiver by the one or more optical elements; and
wherein the waveform generator is configured to generate the one or more electrical drive signals in a manner that causes each of the frequency-chirped optical pulses of the train to have a carrier frequency that sweeps from a first frequency to a second frequency, one of the first and second frequencies being smaller than the fixed carrier frequency, and another one of the first and second frequencies being larger than the fixed carrier frequency.

2. The apparatus of claim 1, wherein the waveform generator is further configured to generate the one or more electrical drive signals in a manner that causes an optical carrier wave having the fixed carrier frequency to be suppressed in the frequency-chirped optical pulses of the train.

3. The apparatus of claim 1, wherein the waveform generator is further configured to generate the one or more electrical drive signals in a manner that causes an instantaneous spectrum of a frequency-chirped optical pulse of the train to substantially have a single modulation sideband of the fixed carrier frequency, the single modulation sideband representing an instantaneous carrier frequency of the frequency-chirped optical pulse.

4. The apparatus of claim 3, wherein the waveform generator is further configured to generate the one or more electrical drive signals in a manner that causes a second modulation sideband of the fixed carrier frequency corresponding to the single modulation sideband to be suppressed in the frequency-chirped optical pulses of the train.

5. The apparatus of claim 1, wherein the first frequency is smaller than the second frequency.

6. The apparatus of claim 1, wherein the first frequency is larger than the second frequency.

7. The apparatus of claim 1, wherein the first frequency and the second frequency are equidistant from the fixed carrier frequency.

8. The apparatus of claim 1, wherein the waveform generator is configured to generate the one or more electrical drive signals in a manner that causes the carrier frequency of each of the frequency-chirped optical pulses to linearly change from the first frequency to the second frequency.

9. The apparatus of claim 1, wherein the optical receiver comprises:
an optical hybrid configured to optically mix said corresponding reflected optical beam and an optical local-oscillator signal that carries a second copy of the train to generate a plurality of optical interference signals;
an optical-to-electrical converter configured to convert the plurality of optical interference signals into a first electrical digital signal and a second electrical digital signal; and
a digital signal processor configured to process at least one of the first and second electrical digital signals to determine the one or more of the distance to the target and the velocity of the target.

10. The apparatus of claim 9, further comprising an optical power splitter configured to generate the optical-probe beam and the optical local-oscillator signal by optically splitting an optical beam that carries the train of frequency-chirped optical pulses.

11. The apparatus of claim 9, wherein the digital signal processor is further configured to supply one or more digital waveforms to cause the waveform generator to generate the one or more electrical drive signals.

12. The apparatus of claim 9, wherein the digital signal processor is further configured to:
partition each of the first and second electrical digital signals into a plurality of portions, each of the portions corresponding to a respective single frequency-chirped optical pulse of the optical-probe beam;
apply a Fourier transform to the plurality of portions to generate a set of digital spectra, the set having one or more digital spectra; and
process the set of digital spectra to determine the one or more of the distance to the target and the velocity of the target.

13. The apparatus of claim 12,
wherein the Fourier transform is a two-dimensional Fourier transform; and
wherein the set of digital spectra includes a two-dimensional frequency spectrum.

14. The apparatus of claim 13, wherein the digital signal processor is further configured to:
perform a spectral analysis of the two-dimensional frequency spectrum to determine first and second frequency coordinates of a cross-peak therein;
compute the velocity of the target using the first frequency coordinate; and
compute the distance to the target using the second frequency coordinate and the velocity of the target.

15. The apparatus of claim 12, wherein the digital signal processor is further configured to:
perform a spectral analysis of the set of digital spectra to determine a corresponding plurality of frequency values, each of the frequency values being a peak frequency of a radio-frequency tone in a respective one of the plurality of digital spectra;
compute an average frequency of said corresponding plurality of frequency values; and
compute the distance to the target using the average frequency.

16. The apparatus of claim 1, wherein the one or more optical elements are reconfigurable to cause the optical-probe beam to optically scan a surface of the target.

17. The apparatus of claim 1,
wherein the optical modulator comprises a nested Mach-Zehnder modulator having a first arm electrically driven by a first of the one or more electrical drive signals and a second arm electrically driven by a second of the one or more electrical drive signals, the second arm connected in parallel to the first arm; and wherein the second arm includes a configurable phase shifter.

18. The apparatus of claim 1, further comprising a laser source configured to generate the optical beam having the fixed carrier frequency.

19. A remote-sensing method comprising:
generating one or more electrical drive signals using a waveform generator;
converting an optical beam having a fixed carrier frequency into a train of frequency-chirped optical pulses by applying the one or more electrical drive signals to an optical modulator;
directing to a target an optical-probe beam that carries a first copy of the train;
receiving from the target a corresponding reflected optical beam; and
determining one or more of a distance to the target and a velocity of the target in response to said corresponding reflected optical beam being detected by an optical receiver; and
wherein the generating comprises generating the one or more electrical drive signals in a manner that causes each of the frequency-chirped optical pulses of the train to have a carrier frequency that sweeps from a first frequency to a second frequency, one of the first and second frequencies being smaller than the fixed carrier frequency, and another one of the first and second frequencies being larger than the fixed carrier frequency.

20. The method of claim 19, further comprising:
optically mixing said corresponding reflected optical beam and an optical local-oscillator signal that carries a second copy of the train to generate a plurality of optical interference signals, said optically mixing being performed using an optical hybrid;
converting the plurality of optical interference signals into a first electrical digital signal and a second electrical digital signal by applying the plurality of optical interference signals to an optical-to-electrical converter; and
electronically processing at least one of the first and second electrical digital signals to determine the one or more of the distance to the target and the velocity of the target.

* * * * *